United States Patent
Nishizawa et al.

(10) Patent No.: US 8,158,250 B2
(45) Date of Patent: Apr. 17, 2012

(54) STRETCHED FILM OF VOID-CONTAINING THERMOPLASTIC RESIN AND PROCESS FOR PRODUCING THE SAME

(75) Inventors: Takatoshi Nishizawa, Kashima-gun (JP); Minoru Kato, Kashima-gun (JP); Hidenori Okuyama, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 12/202,020

(22) Filed: Aug. 29, 2008

(65) Prior Publication Data

US 2009/0041966 A1 Feb. 12, 2009

Related U.S. Application Data

(63) Continuation of application No. 10/067,901, filed on Feb. 8, 2002, now abandoned.

(30) Foreign Application Priority Data

Feb. 9, 2001 (JP) .................................. 2001-33380

(51) Int. Cl.
*B32B 27/32* (2006.01)
(52) U.S. Cl. ................ 428/319.3; 428/319.7; 428/317.9
(58) Field of Classification Search ............... 428/317.9, 428/319.3, 319.7
See application file for complete search history.

(56) References Cited

U.S. PATENT DOCUMENTS

| | | | |
|---|---|---|---|
| 3,921,042 A | 11/1975 | Shenoy | |
| 4,353,970 A | 10/1982 | Dryczynski et al. | |
| 4,486,808 A | 12/1984 | Cardone | |
| 4,777,073 A | 10/1988 | Sheth | |
| 5,091,237 A * | 2/1992 | Schloegl et al. | 428/215 |
| 5,498,474 A * | 3/1996 | Schuhmann et al. | 428/323 |
| 5,552,011 A | 9/1996 | Lin | |
| 5,932,341 A | 8/1999 | Endo et al. | |
| 5,939,181 A * | 8/1999 | Kumano et al. | 428/315.5 |
| 6,176,388 B1 * | 1/2001 | Orndorff | 220/662 |
| 6,468,635 B1 | 10/2002 | Cowell Senft | |
| 6,489,033 B1 | 12/2002 | Hatke et al. | |
| 6,534,189 B1 | 3/2003 | Burns et al. | |
| 6,569,527 B1 | 5/2003 | Calhoun et al. | |
| 6,599,383 B1 | 7/2003 | Wood et al. | |
| 6,620,473 B2 | 9/2003 | Nishizawa et al. | |
| 6,726,969 B1 | 4/2004 | Balaji et al. | |
| 2008/0003423 A1 | 1/2008 | Nishizawa et al. | |

FOREIGN PATENT DOCUMENTS

| | | |
|---|---|---|
| EP | 0 947 544 | 10/1999 |
| EP | 1 122 704 | 8/2001 |
| JP | 9-12749 A | 1/1997 |

(Continued)

OTHER PUBLICATIONS

Patent Abstracts of Japan, JP 2000-211008, Aug. 2, 2000.

(Continued)

*Primary Examiner* — Hai Vo
(74) *Attorney, Agent, or Firm* — Oblon, Spivak, McClelland, Maier & Neustadt, L.L.P.

(57) ABSTRACT

To provide a stretched film of void-containing thermoplastic resin having an attractive force between sheets is 50 g or less. The stretched film of void-containing thermoplastic resin has no charge therein and can be processed secondarily with lesser electrostatic disturbance even in a low-humidity environment.

6 Claims, 3 Drawing Sheets

FOREIGN PATENT DOCUMENTS

| | | |
|---|---|---|
| JP | 2000-1554 A | 1/2000 |
| WO | WO 9961521 A1 | 12/1999 |
| WO | WO 0022601 A1 | 4/2000 |

OTHER PUBLICATIONS

Patent Abstracts of Japan, JP 09-066564, Mar. 11, 1967.

Office Action issued Aug. 30, 2011, in Japanese Patent Application No. 2001-033380 (with English-language translation).

Functional Coating of Plastics and its Industrial Application, published by Nihon Kagaku Joho K.K., Jan. 5, 1987.

Japanese Office Action dated Oct. 19, 2010 in corresponding Japanese Application No. 2001-033380 (with English Translation).

\* cited by examiner

STRETCHED FILM OF VOID-CONTAINING THERMOPLASTIC RESIN AND PROCESS FOR PRODUCING THE SAME

CROSS-REFERENCE TO RELATED APPLICATIONS

The present application is a continuation of U.S. Ser. No. 10/067,901 filed on Feb. 8, 2002 now abandoned, which is based on Japanese patent application no. 33380/2001, filed Feb. 9, 2001, each of which is hereby incorporated herein by reference in its entirety.

BACKGROUND OF THE INVENTION

1. Field of the Invention

The present invention relates to a stretched film of a thermoplastic resin and a process for producing it, wherein a charge potential is controlled during production of the film, and electrostatic disturbance is less in the secondary processing such as printing, coating, vapor deposition, sticking, cutting, etc.

2. Description of the Background

In order to improve the wetting property of the film surface and enhance the adhesion of inks, coating agents, adhesives, etc., it is known to conduct discharge processing on the film surface by applying a high voltage of high frequency to the discharge electrode prior to the secondary processing for the stretched film of thermoplastic resin. In practice, this process has widely been employed in production of film and in the secondary processing. In such a case, the stretched film of thermoplastic resin is considerably charged while passing through the discharged electrodes and the rolls (earth electrodes) since the film is generally of an insulating material. Thus, a discharger is disposed after treatment of discharging to remove a static electricity accumulated on the film surface. Alternatively, a transfer-type antistatic agent such as glycerin fatty acid esters is kneaded into the thermoplastic resin so as to bleed out on the film surface to remove the static electricity.

Resin-based stretched films containing a large number of fine voids therein, which can be prepared by adding an inorganic or organic fine powder to a thermoplastic resin and stretching the resulting resin at a temperature lower than the melting point of the resin, have widely been used for many reasons, for example, high concealment made possible due to high opacity, successful weight reduction, ease of various types of printing depending on its cushion property, etc. In such films, however, the thermoplastic resin generally has a discontinuous structure due to voids in direction of the film thickness (FIG. 1). Thus, it was found that the charge accumulated inside the film by discharge processing could not easily move onto the surface and could not be thoroughly removed with a discharger.

Even if an antistatic agent was kneaded into or coated on the stretched film of void-containing resin, the charge accumulated inside the film by discharge processing could not easily removed, and it remained charged. Many static disturbances have been reported such as spark discharge caused by static electricity on the film surface, difficult arrangement of the cut film, etc., when the secondary processing is made in a low humidity environment (e.g., winter season) where no antistatic agent is used.

An object of the invention is to provide a stretched film of a void-containing resin in which no charge is accumulated and which scarcely produces electrostatic disturbance during the secondary processing in a low humidity environment.

SUMMARY OF THE INVENTION

In view of the above problems in the related art, the present inventors have found that the stretched film of void-containing thermoplastic resin of the invention could overcome the above problems when an attractive force between sheets was 50 g or less.

The stretched film of void-containing thermoplastic resin of the invention has preferably the following characteristics. The charge potential of the film surface after discharging is −10 to 10 kV; the rate of voids is 0.1 to 60%; the opacity is 5 to 100%; the thermoplastic resin is a polyolefin resin; an inorganic fine powder and/or organic filler is contained; particularly, 0.1 to 65 wt % of the inorganic fine powder and/or organic filler is contained; and it is preferably stretched in at least one direction.

Moreover, the invention provides a process for producing the above-mentioned stretched film of void-containing thermoplastic resin, which comprises a discharging step to apply a direct-current voltage overlaid on a high voltage of high frequency to the stretched film of void-containing thermoplastic resin.

Moreover, the invention provides a process for producing the above-mentioned stretched film of void-containing thermoplastic resin, which comprises a discharging step to apply a direct-current voltage overlaid on a high voltage of high frequency to the stretched film of void-containing thermoplastic resin, and a subsequent step to coat an antistatic agent on one side or both sides of the film. Furthermore, the invention provides a process for producing the above-mentioned stretched film of void-containing thermoplastic resin, which comprises a discharging step of applying a direct-current voltage overlaid on a high voltage of high frequency to the stretched film of void-containing thermoplastic resin, and a subsequent step of coating a pigment on one side or both sides of the film.

DETAILED DESCRIPTION OF THE PREFERRED EMBODIMENTS

Figure 1:
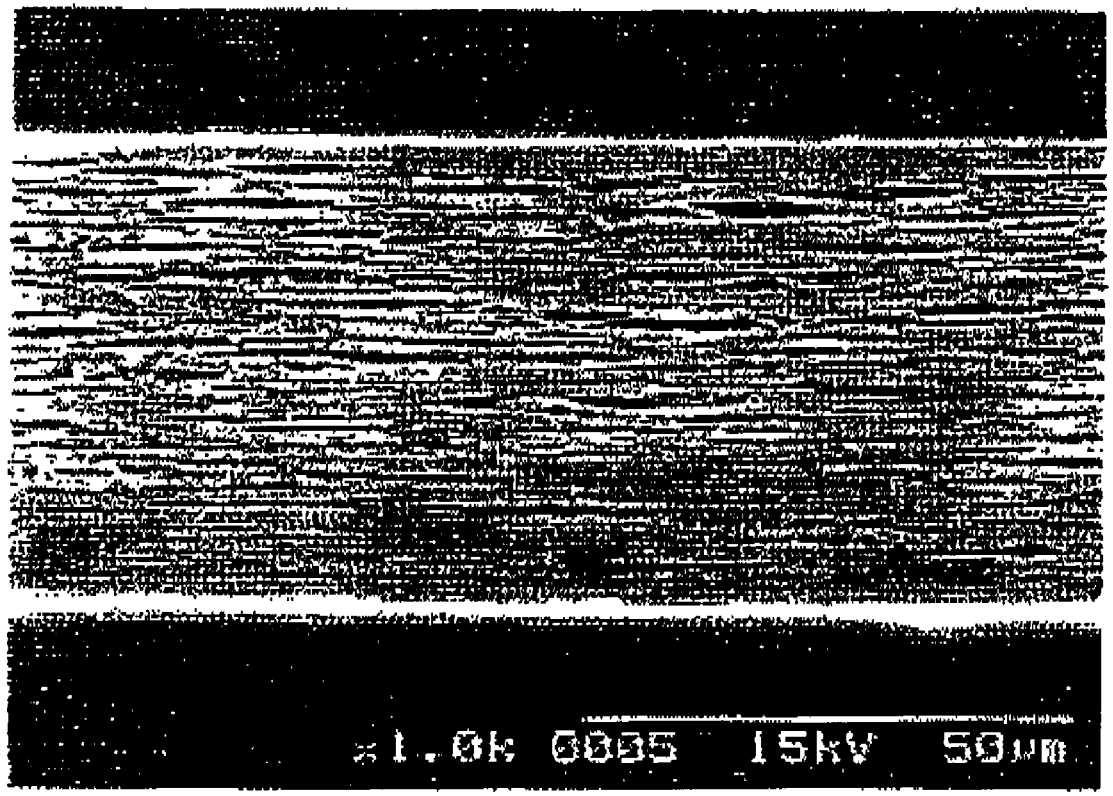
FIG. 1 shows a photograph of an SEM cross section of a typical stretched film of a void-containing resin.

The stretched film of void-containing thermoplastic resin is characterized in that the attractive force between sheets is 50 g or less.

In general, in methods for characterizing the anti-static performance of the thermoplastic resin film, a surface specific resistance (JIS-K-6911) and a charge-decay half-life (JIS-L-1094) have widely been used as parameters. In the surface specific resistance, the anti-static performance is delivered in a static state in an order of the 12th to 13th power, and in a dynamic state in the 10th to 12th power (see, *JETI*, pp. 85-86, Vol. 43, No. 5, 1995). In these methods, however, it is not possible exactly to characterize the degree of occurrence of anti-static disturbance in the secondary processing in the following two points.

In the first point, the surface specific resistance has a value that is determined at a temperature of 20±2° C. and a relative humidity of 65±5% according to JIS-K-6911. This is not a practical condition in which the film is subjected to the secondary processing. In the second point, the above measurement is a characterization of the anti-static performance on the film surface, and there is no characterization on the degree of charged state (charge potential) of the practically produced film. Thus, it has been found that even if the value of the surface specific resistance in some films is the same, a difference in electrostatic disturbance could be produced during the secondary processing because of difference of the charged state in production of the film. The present inventors have reviewed the effect of the charge difference in the film production on the electrostatic disturbance during the secondary processing. As a result, it has been found that the smaller the attractive force between sheets, the smaller the charge potential and the smaller the electrostatic disturbance during the secondary processing.

As mentioned herein, the term "attractive force between sheets" means a force determined by a method for quantitatively measuring the force of two sheets of film pulling against each other by static electricity (an attractive force by static electricity). That is, two sheets of the same film (A4 size; 210 mm×279 mm) are put one over another, and air between them is eliminated by application of a certain weight. After removal of the weight, each sheet is pulled horizontally, at which time the load is measured with a load cell. When the charge potential is larger, the attractive force between sheets is larger, and the value becomes larger due to the sheets sticking fast. Thus, a variety of disturbances occur during the secondary processing. When the value of the attractive force between sheets is 50 g or less, preferably 30 g or less, the film is scarcely charged, and such film hardly produces an electrostatic disturbance during the secondary processing. Even if the sheets of film put over another are allowed to stand in such a state for a long period, there is no change with a lapse of time. At any time point from the production of the film to the secondary processing, it is possible to determine the possibility of occurrence of the electrostatic disturbance in the film.

A discharging process affords a great effect on charging during the production of such stretched film of thermoplastic resin containing voids therein. In a practical embodiment of the invention, a direct-current voltage is overlaid on the high voltage of high frequency during discharging the film so that the charge potential on the film surface after discharging is kept at −10 to 10 kV. Thus, an exceedingly less charged stretched film of void-containing thermoplastic resin, of which the attractive force between sheets is 50 g or less, can be obtained.

Hereinafter, materials used in constituting the stretched film of void-containing thermoplastic resin in the invention and a process for producing it are described as follows.

Thermoplastic Resin:

Raw materials for the stretched film of thermoplastic resin constituting the stretched film of void-containing thermoplastic resin of the invention include polyolefin resins such as propylene resins, high-density polyethylene, medium-density polyethylene, poly-4-methyl-1-pentene, ethylene-cyclic olefin copolymers, etc., polyethylene terephthalate resins, polyvinyl chloride resins, polyamide resins such as nylon-6, nylon-6,6, nylon-6,10, nylon-6,12, etc., ABS resins, ionomer resins, and the like. Preferred are propylene resins, high-density polyethylene, and polyethylene terephthalate resins, which are thermoplastic resins having a melting point in the range of 120 to 280° C. These resins may be used as a mixture of two or more species.

Among them, the polyolefin resins are preferably used. Moreover, among the polyolefin resins, it is preferred to use propylene resins or high-density polyethylene in view of cost, durability, and chemical resistance.

As such propylene resins, a propylene homopolymer (polypropylene) showing an isotactic or syndiotactic property and some degree of tacticity, and propylene copolymers of propylene as a major component with an x-olefin such as ethylene, 1-butene, 1-hexene, 1-heptene, 4-methyl-1-pentene, etc. can be preferably used. These copolymers may be a binary, ternary or quaternary, or random copolymer or a block copolymer.

Inorganic Fine Powder and Organic Filler:

The inorganic fine powder and/or organic filler contained in the stretched film of void-containing thermoplastic resin of the invention are not limited particularly in species.

The inorganic fine powder includes ground calcium carbonate, light calcium carbonate, calcined clay, talc, barium sulfate, diatomaceous earth, magnesium oxide, zinc oxide, titanium oxide, silicon oxide, etc. These may be treated on their surfaces with a fatty acid, etc. Among them, ground calcium carbonate, calcined clay and talc are preferred in view of low cost and easily molding property. The organic filler includes polyethylene terephthalate, polybutylene terephthalate, polyamides, polycarbonates, polyethylene naphthalate, polystyrene, melamine resin, polyethylene sulfite, polyimides, polyethyl ether ketone, polyether-ether ketone, polyphenylene sulfite, poly-4-methyl-1-pentene, polymethyl methacrylate, homopolymers of a cyclic olefin, and copolymers of a cyclic olefin with ethylene. The melting point of the filler is 120 to 300° C. and the glass transition temperature is 120 to 280° C.

From the above inorganic fine powder or organic filler, one species may be selected and used alone or in combination of 2 or more species. The content may preferably be 0.1 to 65 wt %, more preferably 1 to 60 wt %.

Stretched Film of Void-Containing Thermoplastic Resin:

The stretched film of void-containing thermoplastic resin is stretched in at least one direction, and the rate of voids calculated from the following equation (I) is preferably 0.1 to 60%, more preferably 1 to 40%. When the rate of voids is lower than 0.1%, it is difficult to reduce the weight, and when it exceeds 60%, there is a tendency to reduce the strength of the film.

$$\text{Rate of voids}(\%) = [(\rho o - \rho)/\rho o] \times 100 \quad \text{(I)}$$

In the equation, $\rho o$ indicates a true density, and $\rho$ indicates a density of the stretched film (JIS-P8118); the true density is approximately the same as the density before extension as far as the materials before stretching do not contain a large quantity of air.

The opacity of the stretched film of void-containing thermoplastic resin is preferably 5 to 100% (base on JIS-Z-8722). The opacity is preferably 5 or more but lower than 70% in semitransparent film and 70 to 100% in opaque film. When the opacity is lower than 5%, the rate of voids becomes lower than 0.1% to make it difficult to reduce the weight.

The density of the stretched film of void-containing thermoplastic resin is preferably 0.65 to 1.10 g/cm$^3$. The density is preferably 0.90 to 1.10 g/cm$^3$ in semitransparent film, and 0.65 or more but lower than 0.90 g/cm$^3$ in opaque film.

The stretched film of void-containing thermoplastic resin may be made in a monolayer form or as a laminate of two or more layers. Though there is no limitation in the method for lamination, it may be made according to the known lamination method. For example, fused resins extruded from a plurality of extruders may be laminated in a single die by a feed block or multi-manifold (co-extrusion), or alternatively the lamination may be made by fused and extruded laminates or by dry laminates with an adhesive.

There is no limitation in the method of extension. The stretching may be made in a uniaxial or biaxial direction according to a known method, for example, uniaxial stretching in a longitudinal direction, uniaxial multi-stage stretching in a longitudinal direction, uniaxial stretching in a horizontal direction, biaxial stretching in successive longitudinal and horizontal directions, biaxial stretching in concurrent longitudinal and horizontal directions, or a combination of them. The stretching is usually conducted at a temperature lower than the melting point of the thermoplastic resin, wherein separation occurs at the interface of the inorganic fine powder or organic filler with the thermoplastic resin. The separation spreads widely by stretching to form fine voids. The stretching and lamination may be carried out in any combination.

As the stretched film of void-containing thermoplastic resin, for example, polypropylene synthetic papers containing an inorganic fine powder or an organic filler, as described in Japanese Patent Publication Nos. 40794/1971, 55433/1981, Japanese Patent Laid-Open Nos. 149363/1982, 181829/1982, 66564/1997, 198313/1999, and U.S. Pat. No. 4,377,616, are included.

Figure 2:
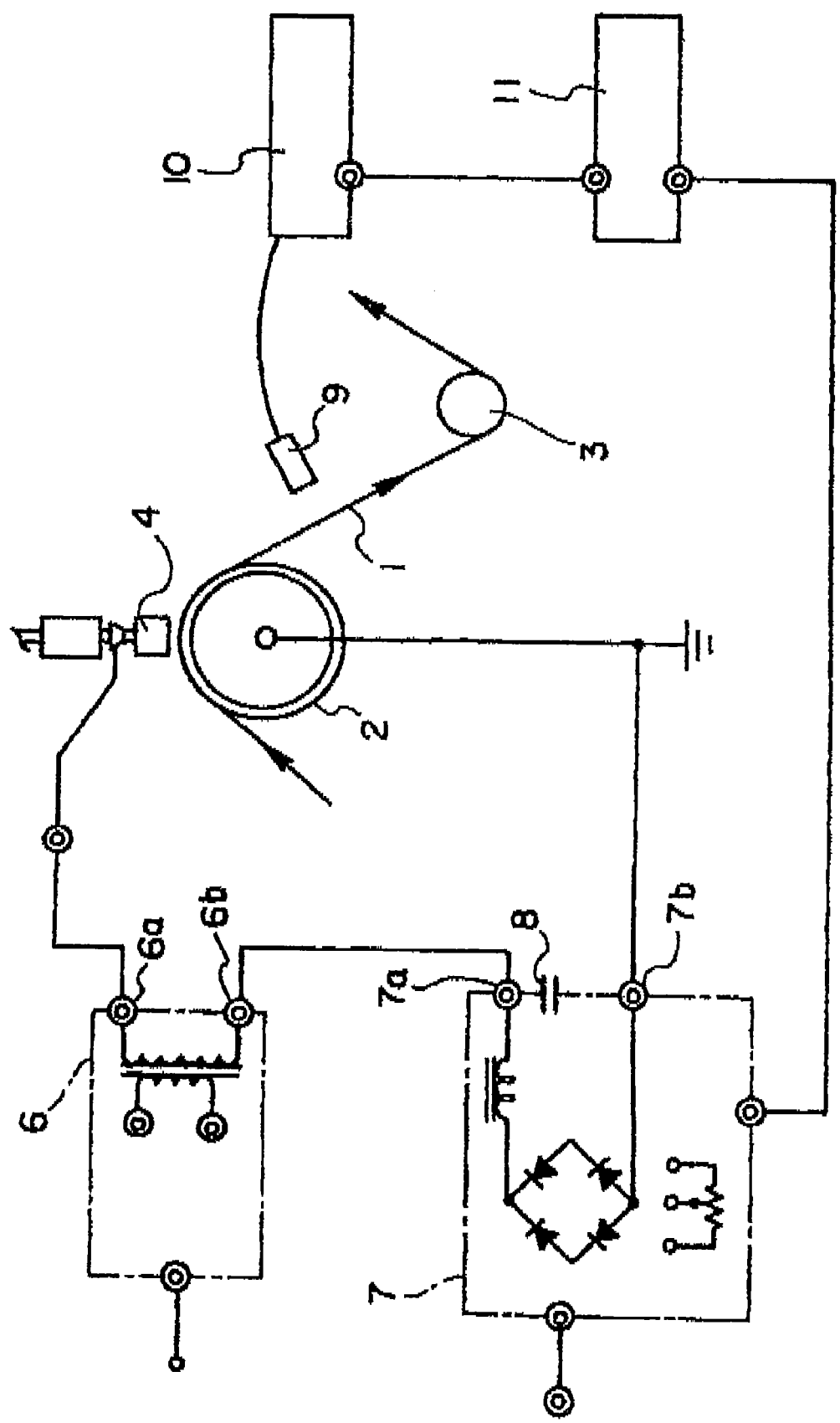
FIG. 2 is a schematic illustration showing an example of a discharging apparatus used in the process of the invention.

Discharge Processing:

FIG. 2 is a schematic illustration showing a discharging apparatus that can be used in production of the stretched film of void-containing thermoplastic resin of the invention. The discharging apparatus as illustrated in FIG. 2 is merely an example, and the stretched film of void-containing thermoplastic resin of the invention may be produced with any other discharging apparatus.

A stretched film 1 of void-containing thermoplastic resin is first introduced on the peripheral surface of a grounded dielectric roll 2 and then into a guide roll 3 to run in the direction following the arrows.

Figure 3:
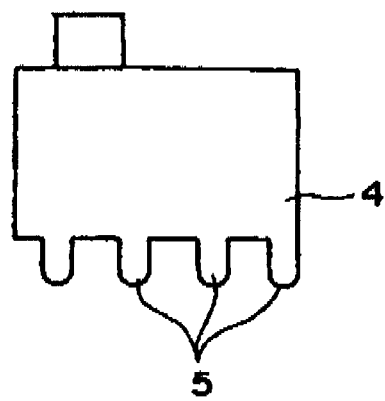
FIG. 3 is an enlarged cross section of the discharging apparatus.

The peripheral surface of the dielectric roll 2 is lined with a silicone. Above the dielectric roll 2, a discharge electrode 4 is disposed in the oppose position. The discharge electrode 4, as shown in FIG. 3, comprises a plurality of knife-type electrode parts 5 (4 edges in the drawing), whose heads are elongated in the direction transverse to the plane of the paper, arranged in parallel. The discharge electrode 4 is hung so that the knife-type electrode parts 5 can approach in parallel the axis of the dielectric roll 2 and form a discharge gap with the peripheral surface of the dielectric roll 2. In this discharging apparatus, a direct-current power source 7 is provided in addition to a high-frequency power source 6 from which a high voltage of high frequency is applied to the discharge electrode 4. One output terminal 6a of the two output terminals 6a and 6b in the high-frequency power source 6 is connected to the discharge electrode 4. The other output terminal 6b is connected to one output terminal 7a of the two output terminals 7a and 7b in the direct-current power source 7 from which a direct-current voltage is applied. The other output terminal 7b of the direct-current power source 7 is grounded. Between the two output terminals 7a and 7b of the direct-current power source 7 is connected a capacitor 8 for bypassing the high-frequency electric current from the high-frequency power source 6 to the earth.

In the path from the dielectric roll 2 to the guide roll 3 is disposed an electric potential sensor 9 which detects, without contact, the charge potential of the film treated with corona discharge between the discharge electrode 4 and the dielectric roll 2. The detected charge potential is sent out from a potential-detecting circuit 10 as a voltage signal corresponding to the potential. The potential sensor 9 is placed between the dielectric roll 2 and the guide roll 3, and in the center of the film width direction. (Though the potential sensor 9 may be placed in the center or edge of the width direction of the stretched film, it is usually disposed in the center of the width direction of the stretched film in view of workability).

Figure 5:
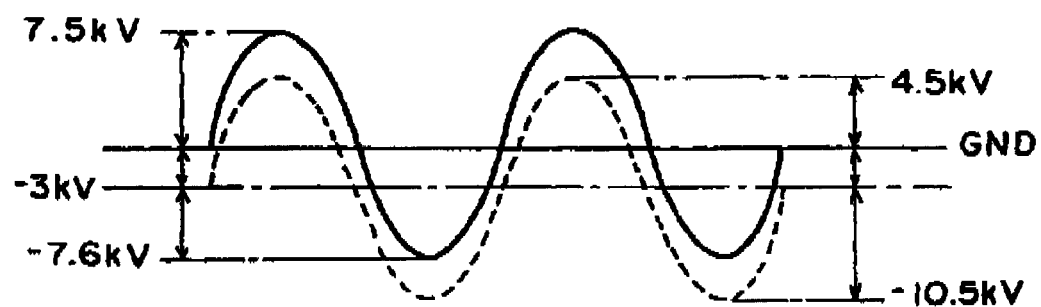
FIG. 5 is a waveform view of the high voltage of high frequency, wherein the solid line indicates the case where the direct-current-overlaid voltage is 0 kV at 7.5 kV of the high voltage of high frequency, and the broken line indicates the case where the overlaid voltage is −3 kV.

In such a layout, the direct-current voltage supplied from the direct-current power source 7 is controlled according to the charge potential detected by the potential sensor 9. The controlled direct-current voltage is overlaid on the high voltage of high frequency supplied from the high frequency power source 6. Thus, the high voltage of high frequency applied on the discharge electrode 4 is shifted to the negative or positive side by the direct-current voltage overlaid. In such a case, when the charge potential on the film 1 detected by the potential sensor 9 is positive, the high voltage of high frequency is shifted to the negative side. When the charge potential is negative, the high voltage of high frequency is shifted to the positive side. FIG. 5 is a waveform view of the high voltage of high frequency, wherein the solid line indicates the case where the direct-current-overlaid voltage is 0 kV at 7.5 kV of high voltage of high frequency, and the broken line indicates the case where the overlaid voltage is −3 kV.

In this connection, the charge potential detected by the potential sensor 9 is −10 kV to 10 kV, preferably −5 kv to 5 kV.

Figure 4:
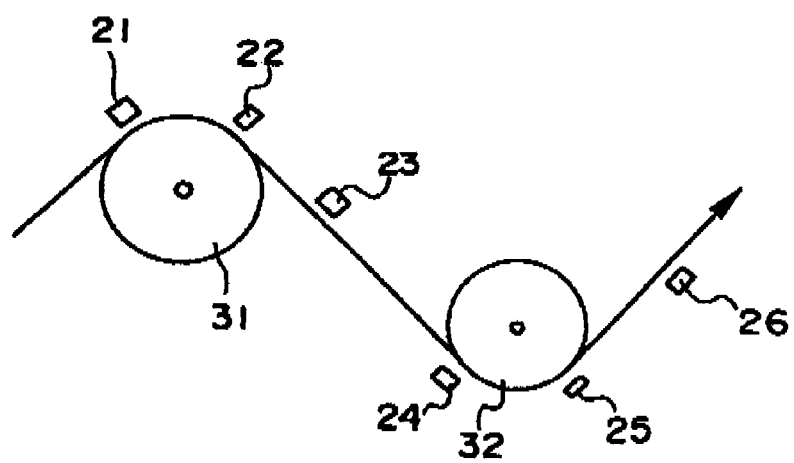
FIG. 4 is a schematic illustration showing an apparatus for discharging on both sides of the film.

In this discharge processing, as shown in FIG. 4, the front and back of the film can be treated for discharging, respectively. For each side, a plurality of discharge electrodes are disposed on a single dielectric roll for discharging, or a plurality of the dielectric rolls and a plurality of discharging electrodes may be used for discharging. In this case, a high voltage of high frequency on which a direct-current voltage has been overlaid may be applied on all of the discharge electrodes. Alternatively, it is preferred to apply a high voltage of high frequency, on which a direct-current voltage has been overlaid, to the last discharge electrode, respectively of the front and back of the film, though the overlaid voltage may be applied to any one of the discharge electrodes.

A control circuit 11 includes an insulation amplifier for converting a voltage signal from the potential-detecting circuit 10 into a current signal. The direct-current power source 7 may be self-controlled so that a direct-current voltage output from the power source 7 is changed in response to the voltage signal from the potential-detecting circuit 10.

Antistatic Agent:

For the stretched film of void-containing thermoplastic resin of the invention, a known antistatic agent may be incorporated as a kneaded mixture or may be coated thereon. Such antistatic agent includes cationic antistatic agents, e.g., amines, imidazolines, amine-ethylene oxide adducts, quaternary ammonium salts, etc.; anionic antistatic agents, e.g., phosphates, alkylarylphosphonic acids, adipic acid, glutamic acid, etc.; non-ionic antistatic agents, e.g., polyhydric alcohols, polyhydric alcohol esters, higher alcohol ethylene oxide adducts, polyethers, alkylphenol ethylene oxide adducts, fatty acid glycerin esters, fatty acid amides and their ethylene oxide adducts, etc.; and amphoteric antistatic agents, e.g., guanidine salts having both cationic and anionic groups, e.g., those from the reaction of an alkylamine with maleic anhydride, sulfonic acids derived from polyethylenimine, etc. Preferred are alkyl-diethanolamines, hydroxyalkyl monoethanolamines, glycerin fatty acid esters, polyglycerin fatty acid esters, sodium alkylsulfonates, sodium alkylbenzenesulfonates, tetraalkylammonium perchlorates, etc. One or two more species of them are selected and used based on the glass transition point of the thermoplastic resin or according to the condition of processing such as extrusion and stretching. Kneading and coating may be given simultaneously.

Pigment Coating:

In order to further improve compatibility with various types of printing using the stretched film of void-containing thermoplastic resin of the invention, it is possible to provide a coat of some pigment on at least the side of printing.

As such pigment coating agents, those used in usual coated paper, for example, containing 10 to 80 wt % of a pigment such as clay, talc, calcium carbonate, magnesium carbonate, aluminum hydroxide, silica, aluminum silicate, calcium silicate, plastic pigments, titanium dioxide, terra alba powder, etc., and 90-20 wt % of an adhesive, are included. The adhesive used in the coating agent includes latexes such as SBR (styrene-butadiene rubber), MBR (methacryl-butadiene rubber), etc., acrylate emulsions (aqueous solutions containing an acrylic ester resin), starch, PVA (polyvinyl alcohol), CMC (carboxymethyl cellulose), methyl cellulose, and the like. In addition to these components, a dispersing agent such as special sodium polycarbonate, crosslinking agents such as polyamide urea resins, anti-foaming agents, water-resisting agents, lubricants, fluorescent paints, etc., may be added. These pigment-coating agents generally may be used as an aqueous coating solution containing 5 to 90 wt %, preferably 35 to 65 wt % of the solid component.

Method and Means for Coating:

As for means for coating such a coating agent on the above substrate layer, gravure coating, Mayer bar coating, roll coating, blade coating, size press coating, hot melt coating, and the like may specifically be employed. The coating amount is 0.1 to 50 g/m$^2$, preferably 1 to 15 g/m$^2$. In such a case, the thickness of the coating is 0.05 to 50 μm, preferably 0.5 to 20 μm, particularly 5 to 15 μm, and the coating layer may be formed on one side or both sides of the film in this thickness.

The coated surface, if required, may be subjected to press smoothing treatment by calendering. The coating may be repeated twice, if required.

The following Examples and Comparative Examples will serve to further specifically illustrate the characteristics of the invention. In the following Examples, the materials, the amount to be used, the ratio, the content of processing, the operation procedure, etc., may be changed properly as far as they do not depart from the purport. Therefore, the scope of the invention should not be considered restrictively in terms of the following Examples. In the Examples and Comparative Examples, "MFR" of the thermoplastic resin is determined according to JIS-K-7210, and the "density" according to JIS-K-7112, respectively.

EXAMPLE 1

A resin composition (A) comprising 67 wt % propylene homopolymer (Nippon Polychem Corp.; trade name: Novatec PP, MA-8; melting point 164° C.), 10 wt % high-density polyethylene (Nippon Polychem Corp.; trade name: Novatec HD, HJ580; melting point 134° C.; density 0.960 g/cm$^3$), and 23 wt % calcium carbonate powder (1.5 μm in particle size) was fused and kneaded in an extruder. The mixture was then extruded from a die at 250° C. to yield a sheet, which was then cooled to about 50° C. This sheet was heated up to 153° C. and stretched 4 times in length utilizing the rotational speed of each roll to yield a uniaxially stretched film.

Separately, a resin composition (B) comprising 51.5 wt % propylene homopolymer (Nippon Polychem Corp.; trade name: Novatec PP, MA-3; melting point 165° C.), 3.5 wt % high-density polyethylene (vide supra; trade name: Novatec HD, HJ580), 42 wt % calcium carbonate powder (1.5 μm in particle size), and 3 wt % titanium oxide powder (0.8 μm in particle size) was fused and kneaded in an extruder at 240° C. The mixture was then extruded from a die in a film form and laminated on the above-described uniaxially stretched film surface to yield a laminate of the surface layer/core layer (B/A).

A mixture of 70 wt % ethylene/1-hexene copolymer (1-hexene content 22 wt %; crystallinity 30; number-average molecular weight 23,000; MFR 18 g/10 minutes; density 0.898 g/cm$^3$; melting point 90° C.) prepared by copolymerizing ethylene with 1-hexene using a metallocene catalyst, and 30 wt % low-density polyethylene (MFR 4 g/10 minutes; density 0.92 g/cm$^3$; melting point 110° C.) prepared by a high-pressure method, was kneaded in a biaxial extruder equipped with a bend and kept at 230° C., and extruded from a die in a strand form and cut into pellets (C) used as a heat seal resin layer.

The composition (B) prepared in the above-described item (2) and the pellets (C) for a heat seal resin layer were fused and kneaded respectively in separate extruders at 230° C., then supplied into a co-extruding die, laminated (B/C) therein at 230° C., and extruded to yield a film, which was then laminated on the A side of the laminate of the above-described surface layer/core layer (B/A) so that the heat seal resin layer (C) became the outside layer.

The resulting 4-layer film (B/A/B/C) was introduced into a tenter oven, heated again up to 155° C., stretched 7 times in a width direction, set at 164° C., cooled to 55° C., and then slit at the edge.

A discharge electrode 4, 3,400 mm in length, 5 mm of the width of protrusion, 5 mm of the interval of protrusion, 2 mm of the height of protrusion, consisting of 4 protrusions, was used. A high frequency power source 6, AGI-201 (Kasuga Electric Works Ltd.), and a direct-current power source 7, discharging apparatus PSD1010PNQ (Kasuga Electric Works Ltd.), were used. A direct-current voltage was overlaid on the B side of the void-containing four-layer film prepared in (5), so that the charge potential of the film surface (B) became 0 kV when measured with the potential sensor 9. Thus, the discharging was conducted under a voltage shifted to the negative side. The discharging condition was as follows: discharge amount 52 W-minute/m$^2$; direct-current voltage −3 kV; discharge voltage +15 to −21 kV; frequency 25 KHz; and discharged current 4 A. Thus, the stretched film of void-containing thermoplastic resin after discharging was obtained.

COMPARATIVE EXAMPLE 1

Similarly in Example 1-(6), discharging was conducted using a high voltage of high frequency at a discharge amount of 52 W-minute/m$^2$ without superimposition of the direct-current voltage. Otherwise, in the same manner as in Example 1, the stretched 4-layer film of void-containing thermoplastic resin was prepared. The charge potential of the side B of the film surface was 40 kV when measured with the potential sensor 9.

COMPARATIVE EXAMPLE 2

Following the discharging in the above Comparative Example 1, an alternating-current type electric remover (Kasuga Electric Works Ltd.) was placed at both sides of the film (B side and C side) to remove electricity to yield the stretched film of void-containing thermoplastic resin. Though the charge potential of the film surface immediately after passing through the electric remover was as low as 0 to 0.8 kV, it increased again and reached about 30 kV at the winding portion.

EXAMPLE 2

Similarly in Example 1-(6), a direct-current voltage was overlaid so that the charge potential became 8 kV at the potential sensor 9. Thus, the voltage was shifted to the minus side for discharging. Otherwise, in the same manner as in Example 1, the stretched 4-layer film of void-containing thermoplastic resin was prepared.

EXAMPLE 3

The discharge operation in Example 1-(6) was changed as follows. Two sets of the discharge electrodes 4 were provided for the stretched 4-layer film of void-containing resin. The upstream set (21 in FIG. 4) of the electrodes was used in discharge with a usual high voltage of high frequency. The downstream set (22 in FIG. 4) was used in discharge with a voltage on which was overlaid a direct-current voltage in response to the charge potential of the film measured using a potential sensor in the same manner as in Example 1. The discharging condition of the upstream electrode was as follows: discharge amount 26 W·minute/$m^2$; discharge voltage +9 to −9 kV; frequency 20 KHz; and discharged current 2 A. The discharging condition of the downstream electrode was as follows: discharge amount 26 W·minute/$m^2$; direct-current voltage −2 kV; discharge voltage +7 to −11 kv; frequency 20 KHz; and discharged current 2 A. The potential sensor (23 in FIG. 4) showed −1 kV. Otherwise, in the same manner as in Example 1, the stretched 4-layer film of void-containing thermoplastic resin was prepared.

EXAMPLE 4

In Example 3, the discharge under superimposition of a direct-current voltage was conducted at the upstream electrode (21 in FIG. 4). The usual discharging with a high voltage of high frequency was conducted at the downstream electrode (22 in FIG. 4). The discharging condition of the downstream electrode was the same as that of the upstream in Example 3. The discharging condition of the upstream electrode was as follows: discharge amount 26 W·minute/$m^2$; direct-current voltage −5 kV; discharge voltage +4 to −14 kV; frequency 20 KHz; and discharged current 2 A. The potential sensor (23 in FIG. 4) showed 1 kV. Otherwise, in the same manner as in Example 1, the stretched 4-layer film of void-containing thermoplastic resin was prepared.

EXAMPLE 5

In Example 3, the discharge was conducted under superimposition of a direct-current voltage at both of the electrodes (upstream, 21 in FIG. 4, and downstream, 22 in FIG. 4). The discharging conditions of the electrodes were respectively as follows: discharge amount 26 W·minute/$m^2$; direct-current voltage −2 kV; discharge voltage +7 to −11 kV; frequency 20 KHz; and discharged current 2 A. The potential sensor (23 in FIG. 4) showed 0 kV. Otherwise, in the same manner as in Example 1, the stretched 4-layer film of void-containing thermoplastic resin was prepared.

EXAMPLE 6

A resin composition (A) comprising 89 wt % propylene homopolymer (vide supra; trade name: Novatec PP, MA-8), 10 wt % high-density polyethylene (vide supra; trade name: Novatec HD, HJ580), and 1 wt % calcium carbonate powder (1.5 μm in particle size) was fused and kneaded in an extruder. The mixture was then extruded from a die at 250° C. to yield a sheet, which was then cooled to about 50° C. This sheet was heated up to 153° C. and stretched 4 times in length utilizing the rotational speed of each roll to yield a uniaxially stretched film.

Separately, a resin composition (B) comprising 85 wt % propylene homopolymer (vide supra; trade name: Novatec PP, MA-3), 5 wt % high-density polyethylene (vide supra; trade name: Novatec HD, HJ580), and 10 wt % calcium carbonate powder (1.5 μm in particle size) was fused and kneaded in an extruder at 240° C. The mixture was then extruded from a die in a film form and laminated on the surface of the above-described stretched film stretched in length to yield a laminate of the surface layer/core layer (B/A).

The composition (B) prepared in the above-described item (2) and the pellets (C) for a heat seal resin layer prepared in Example 1 were fused and kneaded respectively in separate extruders at 230° C., then supplied into a co-extruding die, laminated (B/C) therein at 230° C., and extruded to yield a film, which was then laminated on the side A of the laminate of the above-described surface layer/core layer (B/A) so that the heat seal resin layer (C) became outside.

The resulting 4-layer film (B/A/B/C) was introduced into a tenter oven, heated again up to 160° C., stretched 7 times in a width direction, set at 164° C., cooled to 55° C., and then slit at the edge.

In the same manner as in Example 5, the discharging was conducted with a voltage on which was overlaid a direct-current voltage in response to the charge potential of the film measured using a potential sensor. Thus, the stretched film of void-containing thermoplastic resin was obtained.

EXAMPLE 7

In Example 1 (4), a 3-layer film (B/A/B) was prepared by laminating the layer (B) on the side A of the laminate (B/A) for the surface layer/core layer without forming the layer (C). The resulting 3-layer film was introduced into a tenter oven, heated again up to 160° C., stretched 7 times in a width direction, set at 164° C., cooled to 55° C., and then slit at the edge. The discharging was conducted using the discharge electrode of the front downstream side (22 in FIG. 4) and that of the back downstream side (25 in FIG. 4). In practice, in the same manner as in Example 1, a direct-current voltage was overlaid on both of the discharge electrodes, on which voltages were respectively applied to yield the stretched film of void-containing thermoplastic resin.

EXAMPLE 8

For the stretched 3-layer film of void-containing thermoplastic resin prepared in Example 7, the discharging on the front surface was conducted by applying a usual high voltage of high frequency on the electrode of the front upstream side (21 in FIG. 4). On the back side of the film, a voltage on which was overlaid a direct-current voltage in the same manner as in Example 1 was applied using the electrode of the back downstream side (25 in FIG. 4) to yield the stretched film of void-containing thermoplastic resin.

EXAMPLE 9

The resin composition (A) in Example 1 (1) was fused and kneaded in an extruder, and extruded from a die at 250° C. to yield a sheet, which was then cooled to about 50° C. This sheet was then heated about 148° C. and stretched 4 times in length utilizing the rotational speed of each roll. The sheet was then introduced into a tenter oven, heated again at 157° C., stretched 8 times in a width direction, set at 164° C., cooled to 55° C., and then slit at the edge. The discharging was conducted in the same manner as in Example 7 by superimposing a direct-current voltage on the high voltage of high frequency respectively on the front and back sides, so that the charge potential immediately after charging was shifted to 3 kV. Thus, the stretched film of void-containing thermoplastic resin was obtained.

EXAMPLE 10

The resin component (A) in Example 1 (1) and the propylene homopolymer (D)(vide supra; trade name: Novatec PP, MA-8) were placed respectively in separate extruders and fused and kneaded. These were laminated in a feed block to 3 layers of D/A/D, and extruded from a die at 250° C. to yield a sheet. After this, the sheet was stretched and discharged in the same manner as in Example 9 to yield the stretched film of void-containing thermoplastic resin.

EXAMPLE 11

The resin component (A) in Example 1 (1), a resin component (B) used for the surface layer, and a heat seal resin component (C) were fused and kneaded in separate extruders respectively set at 250° C., 240° C. and 230° C. These were then laminated in a feed block to 3 layers of B/A/C, and extruded from a die at 250° C. in a form of sheet, which was then cooled to 70° C. to yield a 3-layer sheet. This sheet was heated up to 120° C. on rolls and stretched 6 times in length between the rolls. This was cooled to 50° C. and slit at the edge. The discharging was conducted on the B layer side in the same manner as in Example 1 under superimposition of a direct-current voltage to yield the stretched film of void-containing thermoplastic resin.

EXAMPLE 12

The resin component (A) in Example 1 (1) and a resin component (B) used for the surface layer were fused and kneaded in separate extruders respectively set at 250° C. and 240° C. These were then laminated in a feed block to 3 layers of B/A/B, and extruded from a die at 250° C. in a form of sheet, which was then cooled to 70° C. to yield a 3-layer sheet. This sheet was heated up to 130° C. on rolls and stretched 6 times in length between the rolls. This was then cooled to 50° C. and slit at the edge. The discharging was conducted on both of the front side and backside in the same manner as in Example 7 under superimposition of a direct-current voltage to yield the stretched film of void-containing thermoplastic resin.

EXAMPLE 13

On the both sides of the stretched 3-layer film of void-containing thermoplastic resin prepared in Example 7, an antistatic agent (Mitsubishi Chemical Corp., trade name: Suftomer ST3200) was coated at a rate of 0.1 g/m² in 0.5% concentration of solid component with a coater. After drying, the stretched film of void-containing thermoplastic resin was obtained.

EXAMPLE 14

A water-soluble coating agent comprising 39.5 wt % light calcium carbonate, 10 wt % kaolin-clay, 45 wt % emulsion of alkyl acrylate-styrene copolymer resin (Clariant Polymers K. K.; trade name: Movinyl M749J), 5 wt % denatured polyvinyl alcohol (The Nippon Synthetic Chemical Industry Co., Ltd.; trade name; PVA Z-100), and 0.5 wt % polyamide urea resin (Sumitomo Chemical Co., Ltd.; trade name: Sumirez Resin 636) was prepared (the content indicates that of the solid component). This water-soluble coating agent (pigment-coating agent) was coated on both of the sides of the stretched 3-layer film prepared in Example 10 respectively at a thickness of 10 μm with a coater. After drying, the stretched film of void-containing thermoplastic resin was obtained.

TEST EXAMPLE

For the stretched films of void-containing thermoplastic resin prepared in Examples 1 to 14 and Comparative Examples 1 and 2, their density, rate of voids, opacity, charge potential, and attractive force between sheets were determined, and their feeding performance on offset presses was evaluated.

The "density" and "opacity" of the stretched film of void-containing thermoplastic resin were determined respectively according to JIS-P-8118 and JIS-P-8138. The "rate of voids" was calculated from the above-described equation (I).

The "attractive force between sheets" was determined using a measuring apparatus (Toyo Seiki Co., Ltd., TR-2) for coefficient of friction according to JIS-K-7125 as follow. The film was cut into two sheets of A4 size (210 mm×297 mm), which were put one upon another with a gap of 10 mm in the longitudinal direction (297 mm) and placed on a glass plate of the measuring apparatus. The underside sheet was fixed on the glass plate with pieces of a cellophane adhesive tape. The upper sheet was connected to a load cell with a string. A load of 24 g f/cm² was applied uniformly on the whole of the sheets for 1 minute to eliminate air between the sheets. The load was then removed. The glass plate was moved in a parallel direction at a rate of 150 mm/minute to determine the stress required in a horizontal direction when the two sheets were pulled in parallel. The measurements were indicated by gram units and regarded as the attractive force between sheets. The measurement was carried out at 23° C. and a relative humidity of 50%.

The "feeding performance on offset presses" was characterized using a printer Mitsubishi DIAYA II (Mitsubishi Heavy Industries, Ltd.) in an environmental condition at 25° C. and a relative humidity of 30%. 7,000 sheets of the film of a size (636 mm×470 mm) were continuously printed at a rate of 7,000 sheets/hour, during which time the frequency of stops of the printer caused by some trouble (double feeding or gap of sheets) at the feeding or emission of sheets was counted. The trouble was classified into the following 4 degrees.

A: No stop of the printer
    B: One stop of the printer
    C: The printer stopped 2 to 4 times.
    D: The printer stopped 5 times or more to make it practically impossible to continue printing.

It was confirmed that any of the stretched film of void-containing thermoplastic resin prepared in Examples 1 to 14 was small in the attractive force between sheets, and was smooth in feeding of the sheets on offset presses and excellent in printing adaptability. The stretched film of void-containing thermoplastic resin prepared in Examples 1 to 6, which had a heat seal property on the C layer, was confirmed to be suitably applicable to use in various types of heat sealing such as in-mold labeling or header labeling.

On the other hand, any of the stretched film of void-containing thermoplastic resin prepared in Comparative Examples 1 and 2 adhered tightly to each other due to static electricity and was extremely inferior in feeding and emission of the sheets on offset presses.

As mentioned above, the stretched film of void-containing thermoplastic resin of the invention is characterized in that the charge potential during production of the film can be adjusted, and electrostatic disturbance is lower in the secondary processing such as printing, coating, vapor deposition, sticking, cutting, etc. Moreover, the stretched film of void-containing thermoplastic resin of the invention was smooth in feeding and emission of the sheets on offset presses and excellent in printing adaptability. They can also be used widely and appropriately in various types of purposes requiring heat sealing.

Having described the present invention, it will be apparent to one of ordinary skill in the art that many changes and modifications may be made to the above-described embodiments without departing from the spirit and scope of the present invention.

The invention claimed is:

1. A discharge-processed in-mold-forming label having an opacity of 5 to 100% and having heat sealing properties, comprising an inner layer, an intermediate layer and an outer layer,
    wherein the inner layer consists of a polyolefin and an inorganic filler,
    wherein the intermediate layer is a stretched film layer of void-containing polyolefin resin,
    wherein the outer layer consists of a heat sealing polyolefin resin, and
    wherein an attractive force between the labels is 50 g or less, wherein the label surface has a charge potential of −10 to 10 kV.

2. The discharge-processed in-mold-forming label of claim 1, having a rate of voids of 0.1 to 60%.

3. The discharge-processed in-mold-forming label of claim 1, wherein the intermediate layer contains an inorganic fine powder and/or an organic filler.

4. The discharge-processed in-mold-forming label of claim 3, wherein the intermediate layer contains 0.1 to 65 wt % of the inorganic fine powder and/or the organic filler.

5. The discharge-processed in-mold-forming label of claim 1, wherein the film layer is stretched in at least one direction.

6. The discharge-processed in-mold-forming label of claim 1, wherein the intermediate layer contains an antistatic agent.

* * * * *